(12) United States Patent
Fedorova et al.

(10) Patent No.: US 11,386,299 B2
(45) Date of Patent: Jul. 12, 2022

(54) METHOD OF COMPLETING A TASK

(71) Applicant: YANDEX EUROPE AG, Lucerne (CH)

(72) Inventors: Valentina Pavlovna Fedorova, Sergiev Posad (RU); Gleb Gennadievich Gusev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 627 days.

(21) Appl. No.: 16/503,977

(22) Filed: Jul. 5, 2019

(65) Prior Publication Data
US 2020/0160116 A1 May 21, 2020

(30) Foreign Application Priority Data
Nov. 16, 2018 (RU) .......................... RU2018140527

(51) Int. Cl.
*G06K 9/62* (2022.01)
*G06N 20/00* (2019.01)

(52) U.S. Cl.
CPC ......... *G06K 9/6262* (2013.01); *G06K 9/6278* (2013.01); *G06N 20/00* (2019.01)

(58) Field of Classification Search
CPC .... G06K 9/6262; G06K 9/6278; G06N 20/00; G06N 7/005; G06F 17/00
See application file for complete search history.

(56) References Cited

U.S. PATENT DOCUMENTS

| 6,560,597 | B1 | 5/2003 | Dhillon et al. |
|---|---|---|---|
| 7,366,705 | B2 | 4/2008 | Zeng et al. |
| 7,693,738 | B2 | 4/2010 | Guinta et al. |
| 7,747,083 | B2 | 6/2010 | Tawde et al. |
| 8,266,130 | B2 | 9/2012 | Jones et al. |

(Continued)

FOREIGN PATENT DOCUMENTS

| CN | 103914478 A | 7/2014 |
|---|---|---|
| CN | 104463424 B | 3/2015 |

(Continued)

OTHER PUBLICATIONS

Office Action issued in respect of the related U.S. Appl. No. 16/852,512.

(Continued)

*Primary Examiner* — Abhishek Sarma
(74) *Attorney, Agent, or Firm* — BCF LLP

(57) ABSTRACT

A method of completing a task, the task being of a given type of task. The method includes receiving, by a server, an indication of a first result of the task having been completed by a human assessor, executing by the server a machine learning algorithm (MLA) to complete the task by the MLA to generate a second result of the task, determining, by the server, a confidence level parameter indicative of a probability of the first result being correct, and determining, by the server, whether the probability indicated by the determined confidence level parameter exceeds a pre-defined threshold probability. In response to determining that the probability indicated by the determined confidence level parameter exceeds the pre-defined threshold probability, the server processes the task as having been completed with the first result.

22 Claims, 4 Drawing Sheets

(56) References Cited

U.S. PATENT DOCUMENTS

| | | |
|---|---|---|
| 8,498,892 B1 | 7/2013 | Cohen et al. |
| 8,554,605 B2 | 10/2013 | Oleson et al. |
| 8,626,545 B2 | 1/2014 | Van et al. |
| 9,268,766 B2 | 2/2016 | Bekkerman |
| 9,330,071 B1 | 5/2016 | Ahmed et al. |
| 9,584,540 B1 | 2/2017 | Chan et al. |
| 9,594,944 B2 | 3/2017 | Kompalli et al. |
| 9,767,419 B2 | 9/2017 | Venanzi et al. |
| 9,911,088 B2 | 3/2018 | Nath et al. |
| 10,061,848 B2 | 8/2018 | Basu et al. |
| 10,095,688 B1 | 10/2018 | Schilling et al. |
| 10,162,734 B1 | 12/2018 | Podgorny et al. |
| 10,445,671 B2 | 10/2019 | Dubey et al. |
| 10,685,329 B2 | 6/2020 | Taylor et al. |
| 10,978,056 B1 | 4/2021 | Challa et al. |
| 2002/0032591 A1 | 3/2002 | Mahaffy et al. |
| 2003/0154181 A1 | 8/2003 | Liu et al. |
| 2007/0226207 A1 | 9/2007 | Tawde |
| 2007/0260601 A1 | 11/2007 | Thompson et al. |
| 2008/0027913 A1 | 1/2008 | Chang et al. |
| 2010/0153156 A1 | 6/2010 | Guinta et al. |
| 2010/0293026 A1 | 11/2010 | Vojnovic et al. |
| 2011/0173183 A1 | 7/2011 | Dasdan et al. |
| 2011/0313801 A1 | 12/2011 | Biewald et al. |
| 2012/0005131 A1* | 1/2012 | Horvitz ............... G06Q 10/101 706/11 |
| 2012/0131572 A1 | 5/2012 | Shae et al. |
| 2012/0150579 A1 | 6/2012 | De Wit et al. |
| 2012/0265573 A1 | 10/2012 | Van et al. |
| 2013/0006717 A1 | 1/2013 | Oleson et al. |
| 2013/0029769 A1 | 1/2013 | Lee et al. |
| 2013/0096968 A1 | 4/2013 | Van Pelt et al. |
| 2013/0111488 A1 | 5/2013 | Gatti et al. |
| 2013/0159292 A1 | 6/2013 | Larlus et al. |
| 2013/0231969 A1 | 9/2013 | Van et al. |
| 2014/0122188 A1 | 5/2014 | Van Pelt et al. |
| 2014/0172767 A1 | 6/2014 | Chen et al. |
| 2014/0278634 A1 | 9/2014 | Horvitz et al. |
| 2014/0343984 A1 | 11/2014 | Shahabi et al. |
| 2014/0355835 A1 | 12/2014 | Rodriguez-Serrano et al. |
| 2015/0004465 A1 | 2/2015 | Basu et al. |
| 2015/0074033 A1 | 3/2015 | Shah et al. |
| 2015/0086072 A1 | 3/2015 | Kompalli et al. |
| 2015/0178659 A1 | 6/2015 | Dai et al. |
| 2015/0213392 A1 | 7/2015 | Kittur et al. |
| 2015/0254593 A1 | 9/2015 | Ramos et al. |
| 2015/0254596 A1 | 9/2015 | Nayar et al. |
| 2015/0254785 A1 | 9/2015 | Yang et al. |
| 2015/0262111 A1 | 9/2015 | Yu et al. |
| 2015/0317582 A1 | 11/2015 | Nath et al. |
| 2015/0347519 A1 | 12/2015 | Hornkvist et al. |
| 2015/0356488 A1 | 12/2015 | Eden et al. |
| 2015/0356489 A1 | 12/2015 | Kazai et al. |
| 2015/0363741 A1 | 12/2015 | Chandra et al. |
| 2016/0041849 A1 | 2/2016 | Naveh et al. |
| 2016/0100000 A1 | 4/2016 | Dey et al. |
| 2016/0132815 A1 | 5/2016 | Itoko et al. |
| 2016/0140477 A1 | 5/2016 | Karanam et al. |
| 2016/0210570 A1 | 7/2016 | Lee et al. |
| 2016/0232221 A1 | 8/2016 | McCloskey et al. |
| 2016/0035785 A1 | 12/2016 | Fan et al. |
| 2017/0011077 A1 | 1/2017 | Kypreos et al. |
| 2017/0024931 A1 | 1/2017 | Sheffer et al. |
| 2017/0046794 A1 | 2/2017 | Shukla et al. |
| 2017/0052761 A1 | 2/2017 | Gunshor et al. |
| 2017/0061341 A1 | 3/2017 | Haas et al. |
| 2017/0061356 A1 | 3/2017 | Haas et al. |
| 2017/0061357 A1 | 3/2017 | Dubey et al. |
| 2017/0103451 A1 | 4/2017 | Alipov et al. |
| 2017/0154313 A1 | 6/2017 | Duerr et al. |
| 2017/0185944 A1 | 6/2017 | Volkov et al. |
| 2017/0200101 A1 | 7/2017 | Kumar et al. |
| 2017/0220973 A1 | 8/2017 | Byham et al. |
| 2017/0228749 A1 | 8/2017 | Larvol et al. |
| 2017/0293859 A1 | 10/2017 | Gusev et al. |
| 2017/0309193 A1 | 10/2017 | Joseph et al. |
| 2017/0353477 A1 | 12/2017 | Faigon et al. |
| 2017/0372225 A1 | 12/2017 | Foresti et al. |
| 2018/0005077 A1 | 1/2018 | Wang et al. |
| 2018/0144283 A1 | 5/2018 | Freitas et al. |
| 2018/0144654 A1 | 5/2018 | Olsen |
| 2018/0196579 A1 | 7/2018 | Standefer et al. |
| 2018/0331897 A1 | 11/2018 | Zhang et al. |
| 2018/0357286 A1 | 12/2018 | Wang et al. |
| 2019/0258985 A1 | 8/2019 | Guastella et al. |
| 2019/0318291 A1 | 10/2019 | Diriye et al. |
| 2020/0327582 A1 | 10/2020 | Fedorova et al. |
| 2020/0372338 A1 | 11/2020 | Woods et al. |

FOREIGN PATENT DOCUMENTS

| | | |
|---|---|---|
| CN | 105608318 A | 5/2016 |
| CN | 106203893 A | 12/2016 |
| CN | 106327090 A | 1/2017 |
| CN | 106446287 A | 2/2017 |
| CN | 106557891 A | 4/2017 |
| CN | 107767055 A | 3/2018 |
| CN | 107767058 A | 3/2018 |
| CN | 107909262 A | 4/2018 |
| CN | 104794573 B | 5/2018 |
| CN | 109272003 A | 1/2019 |
| CN | 109670727 A | 4/2019 |
| CN | 110020098 A | 7/2019 |
| CN | 110503396 A | 11/2019 |
| CN | 110909880 A | 3/2020 |
| CN | 110928764 A | 3/2020 |
| CN | 111191952 A | 5/2020 |
| CN | 111291973 A | 6/2020 |
| CN | 111723930 A | 9/2020 |
| EP | 3438897 A1 | 2/2019 |
| KR | 102155790 B1 | 9/2020 |
| KR | 102156582 B1 | 9/2020 |
| RU | 2672171 C1 | 11/2018 |
| WO | 0010296 A2 | 2/2000 |
| WO | 2017222738 A1 | 12/2017 |

OTHER PUBLICATIONS

Yu, "Software Crowdsourcing Task Allocation Algorithm Based on Dynamic Utility", IEEE Access ( vol. 7) pp. 33094-33106, Published Mar. 13, 2019.

Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). (Proceedings of the ACM Conference on Computer Supported Cooperative Work, CSCW). https://doi.org/10.1145/2441776.2441847.

Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.

Hung, "An Evaluation of Aggregation Techniques in Crowdsourcing", Web Information Systems Engineering—WISE 2013, 2013, vol. 8181, ISBN : 978-3-642-41153-3.

D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.

Khazankin, "QOS-Based Task Scheduling in Crowdsourcing Environments", Distributed Systems Group, Vienna University of Technology, Argentinierstrasse 8/184-1, A-1040 Vienna, Austria, 2011.

Yuen, "Task recommendation in crowdsourcing systems", Crowdkdd '12 Proceedings of The First International Workshop on Crowdsourcing and Data Mining, pp. 22-26, Beijing, China, Aug. 2012.

Vaibhav B. Sinha et al., "Fast Dawid-Skene: A Fast Vote Aggregation Scheme for Sentiment Classification", Deparlment of Computer Science and Engineering, Indian Institute of Technology Hyderabad, Telangana, India, https://arxiv.org/abs/1803.02781.

Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.

(56) References Cited

OTHER PUBLICATIONS

Hongwei Li et al., "Error Rate Bounds and Iterative Weighted Majority Voting for Crowdsourcing", University of California, Berkeley, Nov. 15, 2014; https://arxiv.org/pdf/1411.4086.pdf.
Hideaki et al., "Analysis of Minimax Error Rate for Crowdsourcing and Its Application to Worker Clustering Model", https://arxiv.org/pdf/1802.04551.pdf Jun. 9, 2018.
Changbo et al., "Online Crowdsourcing", https://arxiv.org/abs/1512.02393.
Vikas et al., "Eliminating Spammers and Ranking Annotators for Crowdsourced Labeling Tasks", Journal of Machine Learning Research 13 (2012)491-518; http://www.jmlr.org/papers/volume13/raykar12a/raykar12a.pdf.
Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.
Lease, "On Quality Control and Machine Learning in Crowdsourcing", School of Information, University of Texas at Austin; https://www.ischool.utexas.edu/~ml/papers/lease-hcomp11 pdf.
Gadiraju, "Understanding Malicious Behavior in Crowdsourcing Platforms: The Case of Online Surveys", http://eprints.whiterose.ac.uk/95877/1/Understanding%20malicious%20behaviour.pdf; https://doi.org/10.1145/2702123.2702443.
Carsten Eickhoff, "Cognitive Biases in Crowdsourcing", Dept. of Computer Science, Zurich, Switzerland, https://brown.edu/Research/AI/files/pubs/wsdm18.pdf.
Ece Kamar, "Identifying and Accounting for Task-Dependent Bias in Crowdsourcing", Microsoft Research, Redmond, WA, USA. http://erichorvitz.com/hcomp_2015_learning_bias.pdf.
Russian Search Report dated Jan. 15, 2021 issued in respect of the counterpart Russian Patent Application No. RU2019116267.
Russian Search Report dated Dec. 16, 2020 issued in respect of the counterpart Russian Patent Application No. RU2019111283.
USTALOV "Towards the Automated Collaborative Process for Language Resource Construction", Inzhenernyy vestnik Dona Journal, Issue No. 1(48), Published Mar. 20, 2018.
P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.
Thorsten et al. "A Collaborative Document Management Environment for Teaching and Learning", published on Jan. 2000. CVE, San Francisco, pp. 197-198 DOI:10.1145/351006.351044.
Office Action dated May 12, 2022 in respect of the related U.S. Appl. No. 16/832,095.
Notice of Allowance dated May 16, 2022 received in respect of a related U.S. Patent Appl. No. 16/777,790.
Li et al., "Crowdsourced Data Management: A Survey", Published on Apr. 19, 2017, IEEE Transactions on Knowledge and Data Engineering, pp. 1-23, DOI: 10.1109/ICDE.2017.26.
Federova et al., "Latent Distribution Assumption for Unbiased and Consistent Consensus Modelling", Published on Jun. 20, 2019, arXiv:1906.08776v1.
Bugakova et al., "Aggregation of pairwise comparisons with reduction of biases", Published on Jun. 9, 2019, arXiv:1906.03711v1.
Simpson et al., "Scalable Bayesian Preference Learning for Crowds", Published on Dec. 11, 2019 arXiv:1912.01987v2.
Notice of Allowance dated Jun. 2, 2022 received in respect of a related U.S. Appl. No. 16/906,074.

\* cited by examiner

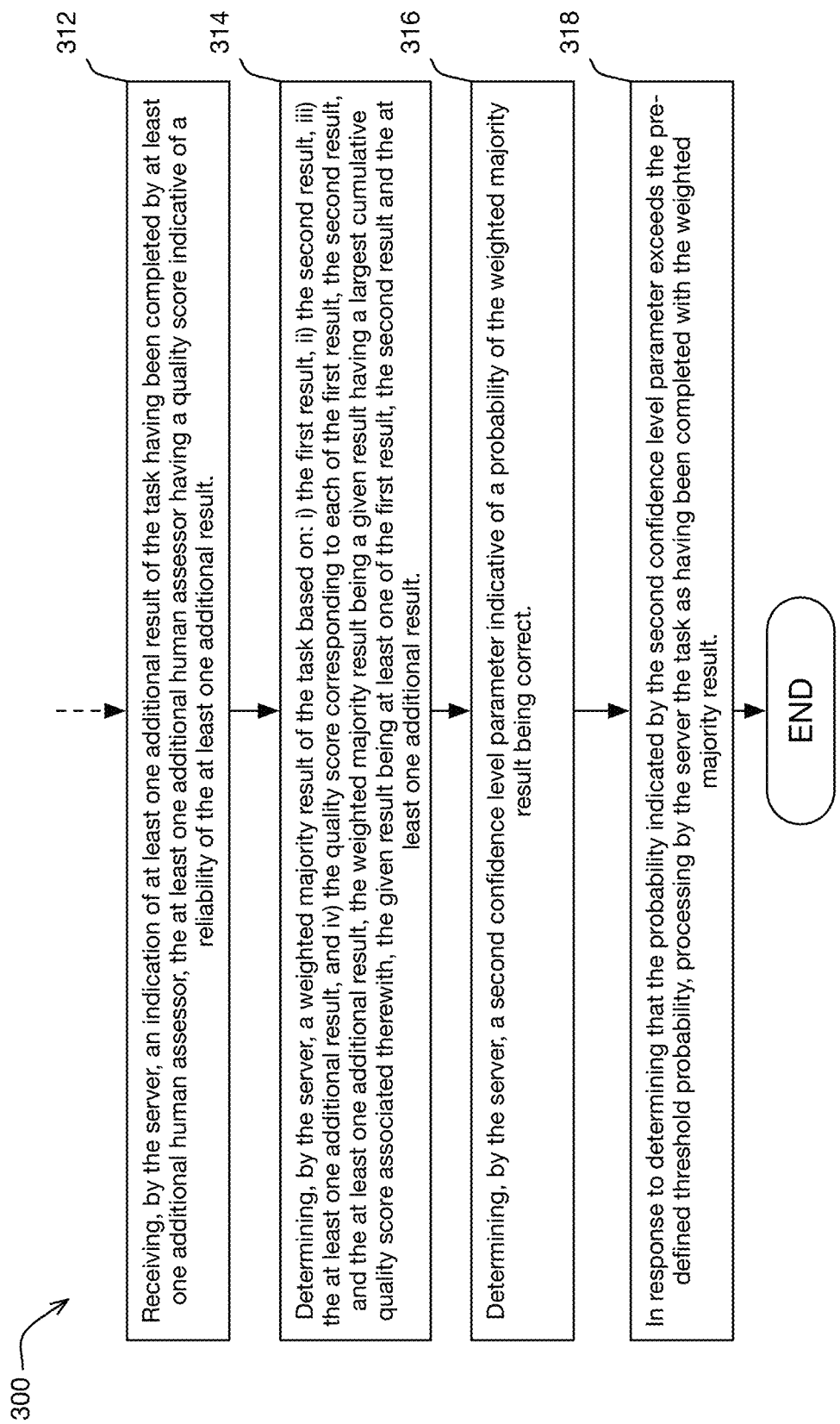

METHOD OF COMPLETING A TASK

CROSS-REFERENCE

The present application claims priority to Russian Patent Application No. 2018140527, filed Nov. 16, 2018, entitled "Method of Completing a Task," the entirety of which is incorporated herein by reference.

FIELD OF TECHNOLOGY

The present technology relates to methods and systems for completing tasks, and more particularly methods and systems for completing crowdsourced tasks.

BACKGROUND

Numerous crowdsourcing methods and systems exist. For example, U.S. Pat. No. 8,626,545 B2, issued on Jan. 7, 2014 and assigned to CrowdFlower Inc., teaches a job distribution platform for aggregating performance data in a worker profile for workers in performing crowd sourced tasks. The patent also teaches a method of generating and storing performance data when a worker performs one or more tasks distributed online to their respective computing devices by a job distribution platform which crowd sources tasks over a network to remote workers. The tasks can span current jobs and a history of previous jobs distributed to the worker and the job performance data for the worker is collected for current and previous jobs. New jobs can be assigned to a worker selected based on performance data of the worker.

As another example, US 2013/0231969 A1, published on September 2013 and assigned to CrowdFlower Inc. teaches a method and a system for generating and distributing tasks to workers to optimize product categorization in an online marketplace, generating and distributing tasks to workers for search engine optimization of a website and/or generating and distributing tasks to workers for business data verification and enhancement. Results can be aggregated from multiple workers to enhance or improve site information, site organization, or other business information to improve site placement in search results and/or to enhance/improve user experience.

While existing crowdsourcing systems and methods may be suitable for their intended purposes, they have drawbacks in at least some circumstances. For example, in at least some cases, prior art methods and systems are relatively expensive to operate. Also in at least some cases, prior art methods and systems take a relatively long time to complete crowdsourced tasks.

SUMMARY

Without wishing to be bound to any specific theory, developers of the present technology have appreciated that in at least some cases, prior art methods and systems have shortcomings.

The present technology has been developed with a view to ameliorating at least one of, and in some implementations, different combinations of, aspects of the prior art.

In summary, the present technology uses a machine learning algorithm (MLA) based assessor to validate one or more human assessors. In at least some cases and at least for some applications, this allows to decrease the number of human assessors that are used. In at least some cases, this approach is more time efficient than prior art crowdsourcing methods and systems and nonetheless allows to obtain a given desired threshold level of confidence in the results. In at least some cases, this approach is more cost efficient than prior art crowdsourcing methods and systems and nonetheless allows to obtain a given desired threshold level of confidence in the results.

More particularly, according to the present technology, one or more MLAs are constructed and trained to execute tasks of a desired types, and a server is configured to execute the one or more MLAs. In use, each of tasks is submitted in at least one iteration to both a corresponding one of the one or more MLAs (to a single MLA in embodiments in which a single MLA for a given type of task is used) and a human assessor. In a first iteration, both the MLA and the human assessor execute a given task and return corresponding results for the given task. Based on these results, the server of the present technology determines a confidence level parameter indicative of a probability of the result provided by the human assessor being correct and compares the indicated probability to a pre-defined threshold probability.

If the pre-defined threshold probability is exceeded, the server processes the given task as having been completed with the result provided by the human assessor. Otherwise, the server executes additional one or more iterations by submitting the task to additional one or more human assessors. At least at each of the additional iterations, and in some embodiments also in the first iteration, the server determines a weighted majority result based on the results provided at each given one of the iterations, the weighted majority result being indicative of an a priori determination of a possible correct result for the given task. At each of the additional iterations, the server determines a new corresponding confidence level parameter based on the weighted majority result and checks whether the probability indicated by the new corresponding confidence level parameter exceeds the pre-defined threshold probability.

The server continues executing the iterations until the pre-defined threshold probability is exceeded. When the pre-defined threshold probability is exceeded at a given iteration, the server processes the given task as having been completed with the result represented by the weighted majority result. In some non-limiting embodiments, the server is further configured with pre-defined lower and/or upper limits on the number of iterations to execute. In at least some non-limiting embodiments, these limits are adjustable by an administrator of the server for example.

In at least some cases, the methods and servers of the present technology can be used to more efficiently, both time wise and cost wise, filter out inappropriate content, such as adult content, from various search providers in order for such search providers to enable so called "child safe" browsing modes for example. Other applications of the present technology are also contemplated.

In view of the above, in a first broad aspect of the present technology, there is provided a method of completing a task, the task being of a given type of task, the method being executed at a server. The method comprises: receiving, by the server, an indication of a first result of the task having been completed by a human assessor, the human assessor having a quality score indicative of a reliability of the first result; executing, by the server, a machine learning algorithm (MLA) to complete the task by the MLA to generate a second result of the task, the MLA having a quality score indicative of a reliability of the second result; and determining, by the server, a confidence level parameter indicative of a probability of the first result being correct, the determining the confidence level parameter being based on the first result, the second result, the quality score of the human assessor, and the quality score of the MLA.

The method further comprises determining, by the server, whether the probability indicated by the determined confidence level parameter exceeds a pre-defined threshold probability, and in response to determining that the probability indicated by the determined confidence level parameter exceeds the pre-defined threshold probability, processing by the server the task as having been completed with the first result.

In some embodiments, the method further comprises determining a weighted majority result based on the first result and the second result, and wherein the determining the confidence level parameter is further based on the weighted majority result.

In some embodiments, the determining the weighted majority result includes determining whether the second result matches the first result.

In some embodiments, the method further comprises determining, by the server, an error probability parameter associated with the human assessor, the error probability parameter associated with the human assessor being indicative of a probability of the first result being incorrect, and an error probability parameter associated with the MLA, the error probability parameter associated with the MLA being indicative of a probability of the second result being incorrect. In some such embodiments, the determining the confidence level parameter is further based on the error probability parameter associated with the human assessor and the error probability parameter associated with the MLA.

In some embodiments, the determining the confidence level parameter comprises executing, by the server, a Bayesian function with inputs into the Bayesian function including: the error probability parameter associated with the human assessor; the error probability parameter associated with the MLA; the quality score of the human assessor; and the quality score of the MLA.

In some embodiments, the determining the error probability parameter associated with the MLA is based on the quality score of the MLA and the determining the error probability parameter associated with the human assessor is based on the quality score of the human assessor.

In some embodiments, the method further comprises, prior to the determining the confidence level parameter, determining by the server: the quality score of the human assessor based on a first plurality of honeypot tasks having been completed by the human assessor, each honeypot task of the first plurality of honeypot tasks having a pre-determined result accessible by the server; and the quality score of the MLA based on a second plurality of honeypot tasks having been completed by the human assessor, each honeypot task of the second plurality of honeypot tasks having a pre-determined result accessible by the server.

In some embodiments, the MLA: has been trained on a set of training tasks, each task of the set of training tasks being of the given type of task and having a pre-determined result; has executed a number of honeypot tasks, the honeypot tasks having pre-defined honeypot results; and has provided, by having executed the number of honeypot tasks, a number of honeypot results. In some such embodiments, the quality score of the MLA is determined as a percentage of the number of honeypot results outputted by the MLA that match a corresponding one of the pre-defined honeypot results.

In some embodiments, the method further comprises submitting, by the server, the task to the human assessor for execution thereof to generate the first result.

In some embodiments, the method further comprises, prior to receiving the indication of the first result, selecting, by the server, the human assessor from a pool of human assessors based on the quality score of the human assessor such that the quality score of the human assessor is above a pre-determined quality score threshold.

In some embodiments, the task is one of: a categorization task, a web page evaluation task, a search result analysis task, a survey task, a relevance inquiry task, a product description analysis task, and a document analysis task.

In some embodiments, the task includes assessing a characteristic of a document.

In some embodiments, the task includes selecting the characteristic from a plurality of different possible characteristics associated with the document.

In some embodiments, the document includes at least one of: an image, a text, at least a part of a web page, a search result, a user interface, at least a part of a survey, a relevance inquiry, and a product description.

In some embodiments, the confidence level parameter is a first confidence level parameter, and wherein the method further comprises, in response to determining that the probability indicated by the first confidence level parameter is below the pre-defined threshold probability: receiving, by the server, an indication of at least one additional result of the task having been completed by at least one additional human assessor, the at least one additional human assessor having a quality score indicative of a reliability of the at least one additional result; determining, by the server, a weighted majority result of the task based on: i) the first result, ii) the second result, iii) the at least one additional result, and iv) the quality score corresponding to each of the first result, the second result, and the at least one additional result, the weighted majority result being a given result having a largest cumulative quality score associated therewith, the given result being at least one of the first result, the second result and the at least one additional result; and determining, by the server, a second confidence level parameter indicative of a probability of the weighted majority result being correct.

In some such embodiments, the method further comprises, in response to determining that the probability indicated by the second confidence level parameter exceeds the pre-defined threshold probability, processing by the server the task as having been completed with the weighted majority result.

In some embodiments, the determining the weighted majority result comprises: determining at least two different groups of results, each group of the at least two different groups of results comprising matching ones of the first result, the second result, and the at least one additional result; determining, for each given group of the at least two different groups of results, a cumulative quality score based on the quality score of each result in the given group of results; selecting one group of the at least two different groups having the largest cumulative quality score of the cumulative quality scores of the at least two different groups of results; and assigning the result represented by the selected one group of results to be the weighted majority result.

In some embodiments, the determining the second confidence level parameter is based on the quality score of each result in the selected one group of results.

In some embodiments, the determining the second confidence level parameter includes determining, by the server, an error probability parameter associated with each result that belongs to a group other than the selected one group of results, the error probability parameter being indicative of a probability of the result associated with the error probability parameter being incorrect. In some such embodiments, the determining the second confidence level parameter is further based on each determined error probability parameter.

In some embodiments, the determining the confidence level parameter comprises executing, by the server, a Bayesian function with each determined error probability parameter being an input to the Bayesian function.

In some embodiments, the MLA: has been trained on a set of training tasks, each task of the set of training tasks being of the given type of task and having a pre-determined result; has executed a number of honeypot tasks, the honeypot tasks having pre-defined honeypot results; and has provided, by having executed the number of honeypot tasks, a number of honeypot results. In some such embodiments, the quality score of the MLA is determined as a percentage of the number of honeypot results outputted by the MLA that match a corresponding one of the pre-defined honeypot results.

In some embodiments, the method further comprises determining, by the server prior to the determining the second confidence level parameter, the quality score of each given human assessor of the human assessor and the at least one additional human assessor based on a plurality of honeypot tasks having been completed by the given human assessor, each honeypot task of the plurality of honeypot tasks having a pre-determined result accessible by the server.

According to another aspect of the present technology, there is provided a server for completing a task, the task being of a given type of task, The server comprises: a processor; and a non-transient memory communicatively connected to the processor, the non-transient memory storing instructions that when executed by the processor, cause the server to: receive an indication of a first result of the task having been completed by a human assessor, the human assessor having a quality score indicative of a reliability of the first result; execute a machine learning algorithm (MLA) to complete the task by the MLA to generate a second result of the task, the MLA having a quality score indicative of a reliability of the second result; determine a confidence level parameter indicative of a probability of the first result being correct, the determining the confidence level parameter being based on the first result, the second result, the quality score of the human assessor, and the quality score of the MLA; determine whether the probability indicated by the determined confidence level parameter exceeds a pre-defined threshold probability; and in response to determining that the probability indicated by the determined confidence level parameter exceeds the pre-defined threshold probability, process the task as having been completed with the first result.

BRIEF DESCRIPTION OF THE DRAWINGS

These and other features, aspects and advantages of the present technology will become better understood with regard to the following description, appended claims and accompanying drawings where:

FIG. 4 depicts a schematic block diagram of a possible continuation of the method of FIG. 3.

DETAILED DESCRIPTION OF NON-LIMITING EMBODIMENTS

Figure 1:
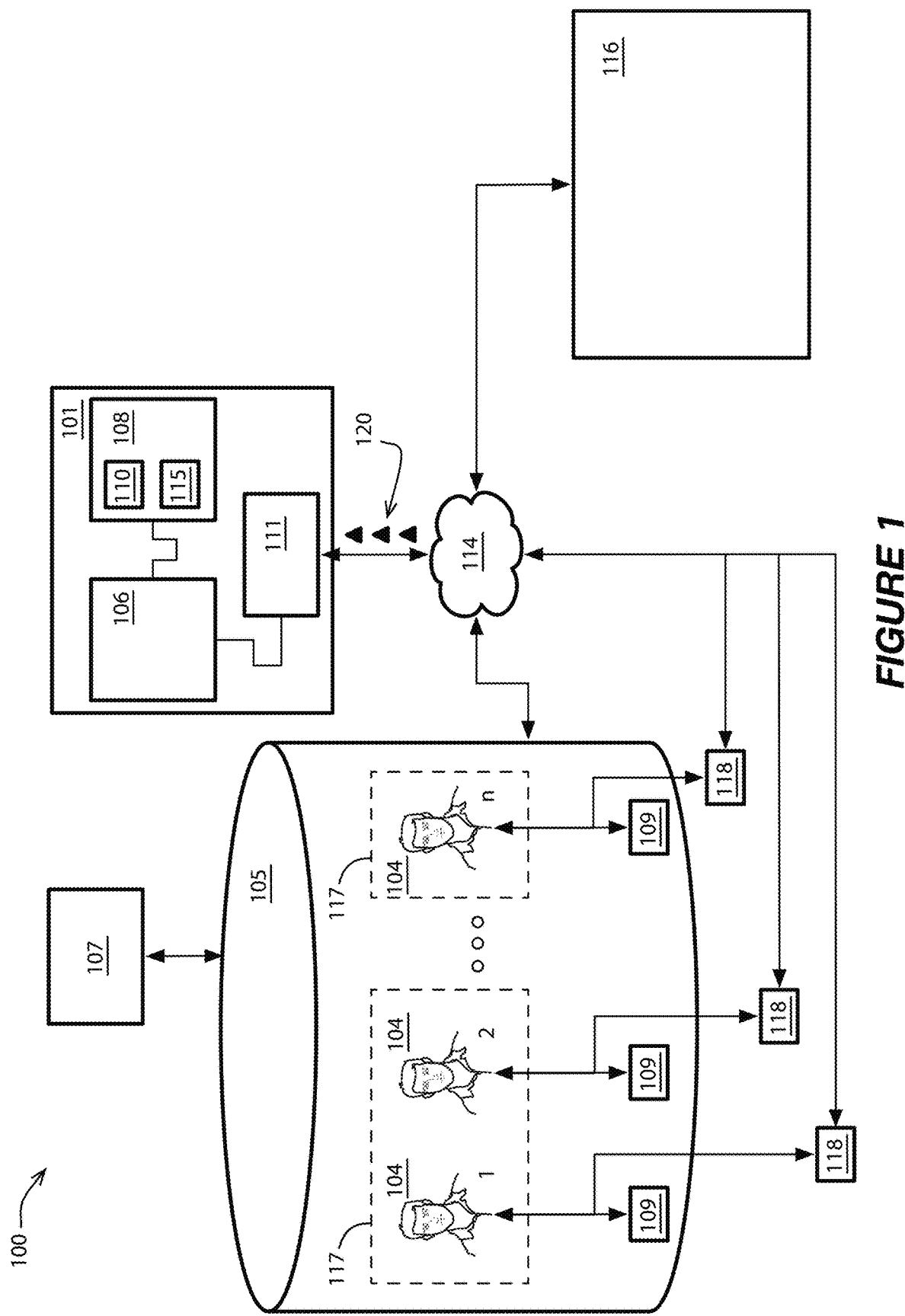
FIG. 1 depicts a schematic diagram of a system suitable for implementing non-limiting implementations of the present technology.

Referring to FIG. 1, there is shown a schematic diagram of a system 100 suitable for implementing non-limiting embodiments of the present technology. The system 100 is depicted as merely as an illustrative implementation of the present technology. The description that follows of the system 100 and methods that can be executed using the system 100 is intended to be only a description of illustrative examples of the present technology. This description is not intended to define the scope or set forth the bounds of the present technology.

In some cases, what are believed to be helpful examples of modifications to the s system 100 and/or methods may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case.

In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

In accordance with the non-limiting embodiments of the present technology, the system 100 comprises a server 101 and a database 105 accessible by the server 101.

As schematically shown in FIG. 1, the database 105 comprises an indication of identities of a pool of human assessors 104, who have indicated their availability for completing at least one type of a crowd-sourced task. The information regarding the human assessors 104 has been schematically shown in FIG. 1 simply as images of human assessors 104 shown in the database 105, and for simplicity is referred to as such.

The execution of the database 105 is not particularly limited and, as such, the database 105 could be implemented using any suitable known technology, as long as the functionality described in this specification is provided for. In accordance with the non-limiting embodiments of the present technology, the database 105 is remote relative to the server 101, is managed by a remote server 107, and is accessible by the server 101 via a communication network 114. The remote server 107 could be any conventional server suitable for maintaining the database 105 and is not particularly limited. The remote server 107 is therefore not described in detail herein.

It is contemplated that the database 105 could be stored at least in part at the server 101 and/or in any other one or more locations and/or could be managed at least in part by the server 101. In accordance with the non-limiting embodiments of the present technology, the database 105 comprises sufficient information associated with the identity of at least some of the human assessors 104 to allow an entity that has access to the database 105, such as the server 101, to submit one or more tasks to be completed by one or more of the human assessors 104.

In accordance with the non-limiting embodiments of the present technology, the database 105 stores a quality score 109 associated with each of the human assessors 104. The quality score 109 of each given human assessor 104 indicates a reliability of a given result of a task completed by the given human assessor 104, or in other words a probability of the given result of the task being correct. In accordance with the non-limiting embodiments of the present technology, the quality scores 109 of the human assessors 104 have been determined as follows. Each of the human assessors 104 has completed a first plurality of "honeypot tasks". In the present specification, the term "honeypot tasks" means a task the correct result of which is known prior to the task being submitted to the given human assessor 104 bring tested/assessed for the quality score associated therewith, for completion thereof, which correct result is not provided to the one or more given human assessor 104 being assessed.

The results of the first plurality of honeypot tasks provided by the human assessors 104 are recorded in the database 105 in a suitable data structure (not depicted). For each given human assessor 104, a percentage of the first plurality of honeypot tasks that the given human assessor 104 completes correctly is calculated and recorded in the database 105 as the quality score 109 of the given human assessor 104. For example, if a given human assessor 104 completes twenty honeypot tasks and provides a result matching the corresponding known correct result to eighteen of the twenty honeypot tasks, then the quality score 109 of the given human assessor 104 is determined to be 18/20=0.9 (90%).

According to the above, the database 105 comprises an indication of the pool of human assessors 104. Further in some non-limiting embodiments of the present technology, the database 105 assigns the stored information associated with each of the available human assessors 104 to one trust group 117 of a plurality of different trust groups 117. Each trust group 117 of the plurality of different trust groups 117 corresponds to a given range of quality scores 109. For example, a one of the trust groups 117 could store information associated available human assessors 104 that have a quality score 109 that falls in the range of 60% and 70%. Another one of the trust groups 117 could store information associated available human assessors 104 that have a quality score 109 that falls in the range of 70% and 80%, and so on. At least one of the trust groups 117 could be a so-called "trusted assessor" group and could store information associated available human assessors 104 whose quality score 109 exceeds 90%.

These particular quality score ranges are non-limiting examples, and could be different depending on the particular application of the present technology. In some embodiments, these ranges are adjustable, for example by an administrator of the server 101 or by requesters to whom the server 101 is made available. Further in some non-limiting embodiments of the present technology, the database 105 also stores pricing information associated with the available human assessors 104. In some embodiments, the pricing information includes an indication of a salary, or remuneration, that each given available human assessor 104 has determined to be a minimum amount payable for a task completed by the given available human assessor 104.

At any given time the pool of human assessors 104 may comprise a different number of human assessors 104, such as fifty human assessors 104 for example, that are available to complete tasks and that have corresponding quality scores 109 that are between 0% and 100%. The pool of human assessors 104 could include more or fewer human assessors 104. It is also contemplated that the database 105 could comprise a plurality of indications of different pools of human assessors 104 that could be accessible to the server 101. Each given pool of human assessors 104 could be, for example, designated for a given particular type of tasks to be completed. The server 101 is described next.

Figure 2:
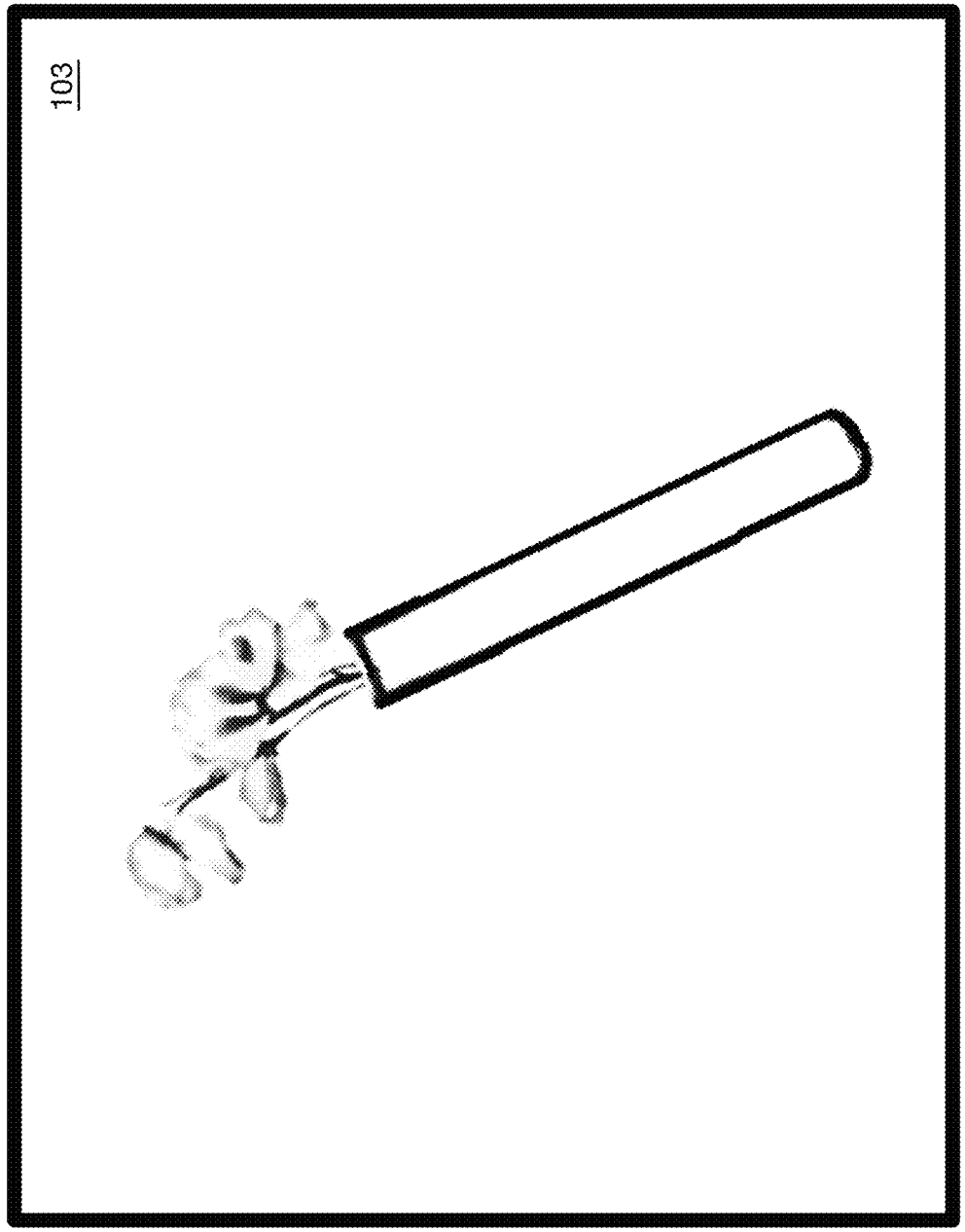
FIG. 2 depicts a photograph of an image with respect to which a non-limiting example of a method according to the present technology could be executed.

In accordance with the non-limiting embodiments of the present technology, the server 101 is configured to complete various tasks, the various tasks comprising tasks of at least one type of tasks for which at least one human assessor 104 is available. A given task could be, for example, a categorization task, a web page evaluation task, a search result analysis task, a survey task, a relevance inquiry task, a product description analysis task, and a document analysis task. A given task could include assessing a characteristic of a document, such as a category thereof, and more particularly selecting the characteristic from a plurality of different possible characteristics associated with the document. Such a document could include, for example, at least one of: an image, a text, at least a part of a web page, a search result, a user interface, at least a part of a survey, a relevance inquiry, and a product description. One non-limiting example of such a document is shown in FIG. 2. In such an embodiment, the task in association with the document of FIG. 2 may include categorizing the document to determine whether the document belongs to Category A ("Non-adult content") or to Category B ("Adult content"), with the categories being mutually exclusive.

In some embodiments, the various tasks that the server 101 is configured to complete include tasks of different types of task. In some embodiments, the various tasks are all of one and the same type of task. In the present specification, description of tasks of a single type, with a focus on a single categorization task to be completed by the server 101, is used to illustrate the present technology. The non-limiting example categorization task that is used in the present specification requires a determination of a category of an image 103, an example of which is shown in FIG. 2. For the sake of an example, the image 103 is a photograph of a flower. The task is to determine whether the image 103 does or does not contain adult content. To this end, in the present example, there are two possible categories that the image 103 could be in, as a non-limiting example: Category A: "Non-adult content", and Category B: "Adult content".

Further in the present example, the determination of the category of the image 103 must be associated with a confidence level that the determination is correct, which confidence level exceeds a pre-defined minimum required confidence level. More particularly, in some non non-limiting embodiments of the present technology, the confidence level must exceed a pre-defined threshold probability (represented by parameter EPS in accordance with the non-limiting embodiments of the present technology) in order for the determination of the category of the image 103 to be deemed sufficiently reliable. More particularly, in the present non-limiting example, the determination must be such that there is a probability of at least 92% of the determination of the category of the image 103 being correct (i.e. EPS=0.92). It should be noted that the value of 92% is just an example and the value of EPS could be pre-defined as a different value and/or could be adjustable. It is also contemplated that the pre-defined threshold probability (EPS) could be defined differently, such as for example from task to task, or in any other way, depending on each particular application of the server 101 and the methods described herein.

In an example of an embodiment of the present technology, the server 101 is implemented as a Dell™ PowerEdge™ Server running the Microsoft™ Windows Server™ operating system. Needless to say, the server 101 can be implemented in any other suitable hardware and/or software and/or firmware or a combination thereof, so long as it is configured as described in the present specification and carries out the functions described in the present specification. In the depicted non-limiting embodiment of present technology, the server 101 is a single server. In some alternative non-limiting embodiments of the present technology, the functionality of the server 101 is distributed and/or implemented via multiple servers. In some embodiments of the present technology, the server 101 is operated by an operator of a search engine, such as the operator of the Yandex™ search engine. It is contemplated that the server 101 can be operated by any other one entity, such as another search engine operator and the like.

In accordance with the non-limiting embodiments of the present technology, the server 101 comprises a communication interface 111 structured and configured to communicate with various entities via a communication network 114. Examples of the various entities include the database 105, respective electronic devices 118 of human assessors 104, and other devices that may be coupled to the communication network 114. The server 101 further comprises at least one processor 106 operationally coupled with the communication interface 111 and structured and configured to execute various steps and methods and processes described herein. The server 101 further comprises a non-transient memory 108 communicatively coupled to the at least one processor 106, the non-transient memory 108 storing instructions that when executed by the processor 106 cause the server 101 to execute the various steps and methods and processes described herein.

The server 101 stores in the non-transient memory 108 computer executable instructions to enable the processor 106 to execute a machine learning algorithm (MLA) 110. It is contemplated that the MLA 110 could be stored at least in part remotely from the server 101, such as at another server for example, while still being accessible to and executable by the at least one processor 106, and therefore by the server 101. In accordance with the non-limiting embodiments of the present technology, the MLA 110 has been trained (i.e. is pre-trained) on a set of training tasks, each task of the set of training tasks being of the given type(s) of task that the server 101 is configured to complete and having a pre-determined result which is known to be correct.

In the present example with the task being determining one of two possible categories of the image 103, the MLA 110 has been trained on a set of training image categorization tasks which had the same possible categories and the correct category of each of which was known. More particularly, in the present non-limiting example, the training images included images that were known to be of Category A "Non-adult content", and images that were known to be of Category B "Adult content". Using the training images as training examples, the MLA 110 was "taught" to determine whether a given image of an unknown category falls into Category A or Category B.

In some non-limiting embodiments of the present technology, the MLA 110 has further been associated with a quality score 115. To that end, the MLA 110 has executed a second plurality of honeypot tasks, the second plurality of honeypot tasks having pre-defined honeypot results which are known to be correct, for the purpose of determining an accuracy, or reliability, of the answers provided by the trained MLA 110. In the present example, the second plurality of honeypot tasks were images that were different from the training images, and included both included images that were of Category A "Non-adult content", and images that were of Category B "Adult content".

By having executed at least a number of the second plurality of honeypot tasks, the MLA 110 has provided a number of honeypot results, one result for each corresponding one of the number of the second plurality of honeypot tasks. In the present example, each of the honeypot images (tasks) were fed into the MLA 110 and for each of the images the MLA 110 provided an indication of whether the image is of Category A or Category B. These indications are referred to herein as the honeypot results.

Next, these honeypot results from the MLA 110 have been used to determine the quality score 115 of the MLA 110. In accordance with the non-limiting embodiments of the present technology, the quality score 115 of the MLA 110 is stored in the non-transient memory 108 and is determined as a percentage of the number of the second plurality of honeypot tasks outputted by the MLA 110 that match a corresponding one of the pre-defined honeypot results.

In the present example, let's say the MLA 110 has categorized each one of one hundred honeypot images as belonging either to Category A or to Category B. The MLA 110 categorization of each given honeypot image of the one hundred honeypot images was then compared, for example by human assessors or by any suitable known comparison algorithm executed at any suitable electronic device, to the known category of the given honeypot image.

It was then recorded in the non-transient memory 108 of the server 101 (although any other suitable location accessible by the server 101 could also have been used), for each given image of the one hundred honeypot images, whether the MLA 110 outputted the correct category of the given image or an incorrect category of the given image.

An overall percentage of correct categorizations was then determined and stored as the quality score 115 of the MLA 110. For the sake of an example, let's say it was determined that the MLA 110 correctly categorized 70 of the 100 images. In such a case, the quality score of the MLA 110 is 70 divided by 100, which equals 0.70 (70%). The number of honeypot tasks given above is used as a non-limiting example only, and can be different depending on each given application of the server 101 and the methods described herein.

As a result of the abovementioned training and quality score 115 determination steps, the MLA 110 can be considered to be trained to categorize images of unknown category into one of: Category A and Category B. Accordingly and using the above-presented example, it can be said that at this point the server 101 is configured to execute the MLA 110 to determine the category of an unknown image, at an expected confidence level of 70%.

In accordance with the non-limiting embodiments of the present technology, in addition to being configured to execute a given image categorization task, the server 101 is configured to submit a given image categorization task to at least one given human assessor 104 of the pool of human assessors 104 available via the database 105. More particularly, the server 101 is configured to receive an image, such as the image 103, from any suitable source such a Yandex™ search engine 116 that the server 101 may be in communication with, and to send the image to an electronic device 118 used by the at least one given human assessor 104 to complete tasks, via the communication network 114 for example.

It is contemplated that any suitable file transfer technology and/or medium could be used for this purpose. It is also contemplated that the task could be submitted to the at least one given human assessor 104 via any other suitable method, such as by making the task remotely available to the at least one given human assessor 104. It is also contemplated that an entity other than the server 101, such as the remote server 107, could be used to submit tasks to the at least one given human assessor 104.

In accordance with the non-limiting embodiments of the present technology, the server 101 is configured to receive an indication of a result of the given image categorization task having been completed by the at least one given human assessor 104. In accordance with the non-limiting embodiments of the present technology, the indication of a given result could be received by the server 101 in one or more data packets 120 over the communication network 114 for example. It is contemplated however than any other suitable data transfer means could be used.

The server 101 is also configured to execute the MLA 110, as described above, to complete the given image categorization task that is submitted, or that is to be submitted, to the at least one given human assessor 104, and to receive an indication of a result of the given image categorization task having been completed by the MLA 110. Similar to receiving indications of results from human assessors 104, the indication of results from the MLA 110 could be generated and transferred/communicated using any suitable technology so long as the functionality described in the present specification is achieved.

In accordance with the non-limiting embodiments of the present technology, the server 101 is configured to determine, for each given task, a confidence level parameter ($a_j$) indicative of a probability of a given result of the given task provided by the at least one given human assessor 104 being correct. In accordance with the non-limiting embodiments of the present technology, the server 101 determines the confidence level parameter ($a_j$) based on the result of the given task provided by the at least one given human assessor 104, the result of the given task provided by the MLA 110, the quality score 109 of the at least one given human assessor 104, and the quality score 115 of the MLA 110.

In accordance with the non-limiting embodiments of the present technology, the server 101 is configured to determine the confidence level parameter ($a_j$) via a first step referred to in the present specification as an a priori determination, followed by a second step referred to in the present specification as an a posteriori determination. These steps are described next.

In accordance with the non-limiting embodiments of the present technology, in the first a priori determination step, the server 101 determines a weight ($q_w$) of the result provided by each of the at least one given human assessor 104 and the MLA 110. In accordance with the non-limiting embodiments of the present technology, the weight ($q_w$) is indicative of a probability of a corresponding result being correct and each of the at least one given human assessor 104 and the MLA 110 is treated as an assessor ($w_1$, $w_2$, ... $w_n$). Based on this, the weight ($q_w$) of the result provided by a given one of the assessors ($w_1$, $w_2$, ... $w_n$) is calculated according to the following formula/function:

$$q_w := (K+c_w)/(2K+t_w) \qquad \text{Formula 1}$$

where for a given assessor (w), $c_w$ is a number of correct honeypot results provided by the given assessor (w) out of a total of $t_w$ results for honeypot tasks completed by the given assessor (w). K is a parameter for smoothing out the calculation of the weight ($q_w$). In accordance with at least some of the non-limiting embodiments of the present technology, K=10. It is contemplated that depending on each given application of the server 101 for example, the K parameter could be set to a different value and/or could be adjustable. It is also contemplated that the weight ($q_w$) for each of the assessors ($w_1$, $w_2$, ... $w_n$) could be calculated according to a different method.

Next, a weighted majority result ($\hat{z}_j$) of the given task based on the result of the given task provided by each of the at least one given human assessor 104 and the result of the given task provided by the MLA 110, is determined. It is contemplated that in some embodiments, this step could be omitted or could be different. In accordance with the non-limiting embodiments of the present technology, the weighted majority result ($\hat{z}_j$) is a result having a largest cumulative quality score associated therewith. In accordance with the non-limiting embodiments of the present technology, the weighted majority result ($\hat{z}_j$) is determined by the server 101 executing the following formula/function:

$$\hat{z}_j := \text{argmax}_{z \in Y} \Sigma_{i-1}^n q_{w_i} * I(y_j^{w_i} = z) \qquad \text{Formula 2}$$

where $D = \{y_j^{w_1}, \ldots y_j^{w_n}\}$ is the collection of the results ($y_j$) of the given task provided by the at least one given human assessor 104 and the MLA 110, each of which is treated as an assessor ($w_1$, $w_2$, ... $w_n$); and where Y represents the various possible results of the given task (in the present non-limiting example, the possible categories A and B), $q_{wi}$ is a weight assigned to a result provided by assessor $w_i$, and I( ... ) is an indicator function (i.e. the indicator function is equal to 1 when true and equal to 0 when false).

Next, the a posteriori determination is executed by the server 101 to determine a probability of the weighted majority result ($\hat{z}_j$) being correct, the probability being represented as $E(\hat{z}_j = z_j | D)$. In accordance with the non-limiting embodiments of the present technology, in the a posteriori determination the server 101 is configured to determine the confidence level parameter as parameter $a_j$, the parameter $a_j$ being indicative of the probability of the weighted majority result ($\hat{z}_j$) being correct, based on the following configuration of the Bayesian function:

$$E(\hat{z}_j = z_j | D) = \frac{Pr(D | z_j = \hat{z}_j) Pr(z_j = \hat{z}_j)}{Pr(D)}. \qquad \text{Formula 3}$$

In some embodiments in which the step of determining the weighted majority result ($\hat{z}_j$) is omitted at a first step at which a task is sent to a first human assessor 104a, the a priori correct result ($\hat{z}_j$) is assumed to be the result provided by the first human assessor 104a, and the confidence level parameter as parameter $a_j$ is calculated directly for the result provided by the first human assessor 104a, using the same Bayesian function for example.

In the present configuration of the Bayesian function, labeled as Formula 3 above, $Pr(z_j = \hat{z}_j)$ is the a priori distribution of the results of the given task. In accordance with the non-limiting embodiments of the present technology, it is defined to be an even distribution. Therefore, the present configuration of the Bayesian function is programmed in the instructions in the non-transient memory 108 of the server 101 as the following configuration of the Bayesian function:

$$a_j := E(\hat{z}_j = z_j \mid D) = \frac{\prod_{i=1}^{n} q_{w_i}^{I(y_j^{w_i}=\hat{z}_j)} e_{w_i}^{1-I(y_j^{w_i}=j)}}{\sum_{z \in Y} \prod_{i=1}^{n} q_{w_i}^{I(y_j^{w_i}=z)} e_{w_i}^{1-I(y_j^{w_i}=z)}}. \quad \text{Formula 3}$$

In accordance with the non-limiting embodiments of the present technology, in the above function, it is defined that a given assessor $w_i$ provides a correct result for a given task with a probability of $q_{wi}$ and provides any other result for the given task with a probability of $e_w:=(1-q_w)/(|Y|-1)$. In accordance with the non-limiting embodiments of the present technology, the parameter $e_w$ is an error probability parameter and I( ... ) is an Indicator Function which is equal to 1 when true and 0 when false.

Once the confidence level parameter ($a_j$) is determined based on the above, whether with or without the weighted majority result determination, the server 101 determines, by a suitable comparison algorithm for example, whether the probability indicated by the determined confidence level parameter ($a_j$) exceeds the pre-defined threshold probability (EPS) described above. If the probability indicated by the determined confidence level parameter ($a_j$) exceeds the pre-defined threshold probability (EPS) (i.e. if $a_j$>EPS), the server 101 processes the given task as being completed with the weighted majority result) ($\hat{z}_j$) in cases where the weighted majority result) is determined, or with the first result (in which case $\hat{z}_j$ is the first result) provided by the first human assessor 104a in a first iteration and in cases where the weighted majority result determination is not performed. When a given task is processed as having been completed, the given task is not sent for execution thereof by additional human assessors.

In accordance with the non-limiting embodiments of the present technology, the server 101 is further configured, where the probability indicated by the determined confidence level parameter ($a_j$) does not exceed the pre-defined threshold probability (EPS) (i.e. if $a_j$<EPS or if $a_j$=EPS), to submit the given task to at least one additional human assessor 104 of the pool of human assessors 104 and to receive an indication of at least one additional result of the given task having been completed by the at least one additional human assessor 104, and to determine the weighted majority result ($\hat{z}_j$) and the confidence level parameter ($a_j$) based on the new set of results of the given task based on the algorithm and functions as described above. The server 101 then determines whether the new confidence level parameter ($a_j$) exceeds the pre-defined threshold probability (EPS).

If the new confidence level parameter ($a_j$) does exceed the pre-defined threshold probability (EPS), then the server 101 processes the given task as being completed with the weighted majority result ($\hat{z}_j$) determined at this second iteration. Again, when a given task is processed as having been completed, the given task is not sent for execution thereof by additional human assessors. At this second iteration, the weighted majority result ($\hat{z}_j$) could be either the first result provided by the first human assessor 104a, or the result provided by the MLA 110 and the at least one additional human assessor 104, depending on which results of the new set of results match.

If at the second iteration the new confidence level parameter ($a_j$) does not exceed the pre-defined threshold probability (EPS), then the server 101 yet again submits the given task to yet another at least one additional human assessor 104 of the pool of human assessors 104 and receives an indication of at least one additional result of the given task having been completed by the yet other at least one additional human assessor 104. The server 101 then again determines the weighted majority result ($\hat{z}_j$) and the confidence level parameter ($a_j$) based on the new set of results of the given task based on the algorithm and functions as described above. The server 101 continues these iterations until a weighted majority result ($\hat{z}_j$) and a corresponding confidence level parameter ($a_j$) is determined, which confidence level parameter ($a_j$) exceeds the pre-defined threshold probability (EPS). At that point, the server 101 processes the given task as being completed with the weighted majority result ($\hat{z}_j$) corresponding to the confidence level parameter ($a_j$) that exceeded the pre-defined threshold probability (EPS).

The server 101 can execute a plurality of tasks as per above, either in parallel or in a sequence, or in a combination of parallel and sequential processing. For example, in some non-limiting embodiments of the present technology, the server 101 executes a plurality of the MLAs 110. In some such embodiments, tasks are sent to the MLAs 110 for execution thereof in parallel (i.e. simultaneously). For example, a given first task can be submitted to a first MLA (not shown) of the MLAs 110 and to a first human assessor 104, a given second task can be submitted to a second MLA (not shown) of the MLAs 110 and to a second human assessor 104, and so on. In some non-limiting embodiments, the MLAs 110 are all trained to execute one and the same type of task. In other non-limiting embodiments, the MLAs 110 are trained to execute a plurality of different types of task, and may include different types of MLA.

It is contemplated that the server 101 could be further configured to have limits on the minimum and maximum number of human assessors 104 to be used for a given task. Such minimum and maximum limits could be defined as, for example, parameters N_MIN and N_MAX, respectively. In some embodiments, the N_MIN parameter is equal to 1, and the N_MAX parameter is equal to 5.

In such embodiments, the server 101 submits a given task to at least one human assessor 104 before the server 101 determines a weighted majority result ($\hat{z}_j$) as described above, and processes the given task as completed if after receiving an indication of a result of the given task from the fifth human assessor 104 the confidence level parameter ($a_j$) is still equal to or below the pre-defined threshold probability (EPS). In some such cases, the server 101 is configured to mark the given task as having failed and/or not met the pre-defined threshold probability (EPS) requirement. In embodiments that include such minimum and maximum limits, the limits could be adjustable, by an administrator of the server 101 for example.

Figure 3:
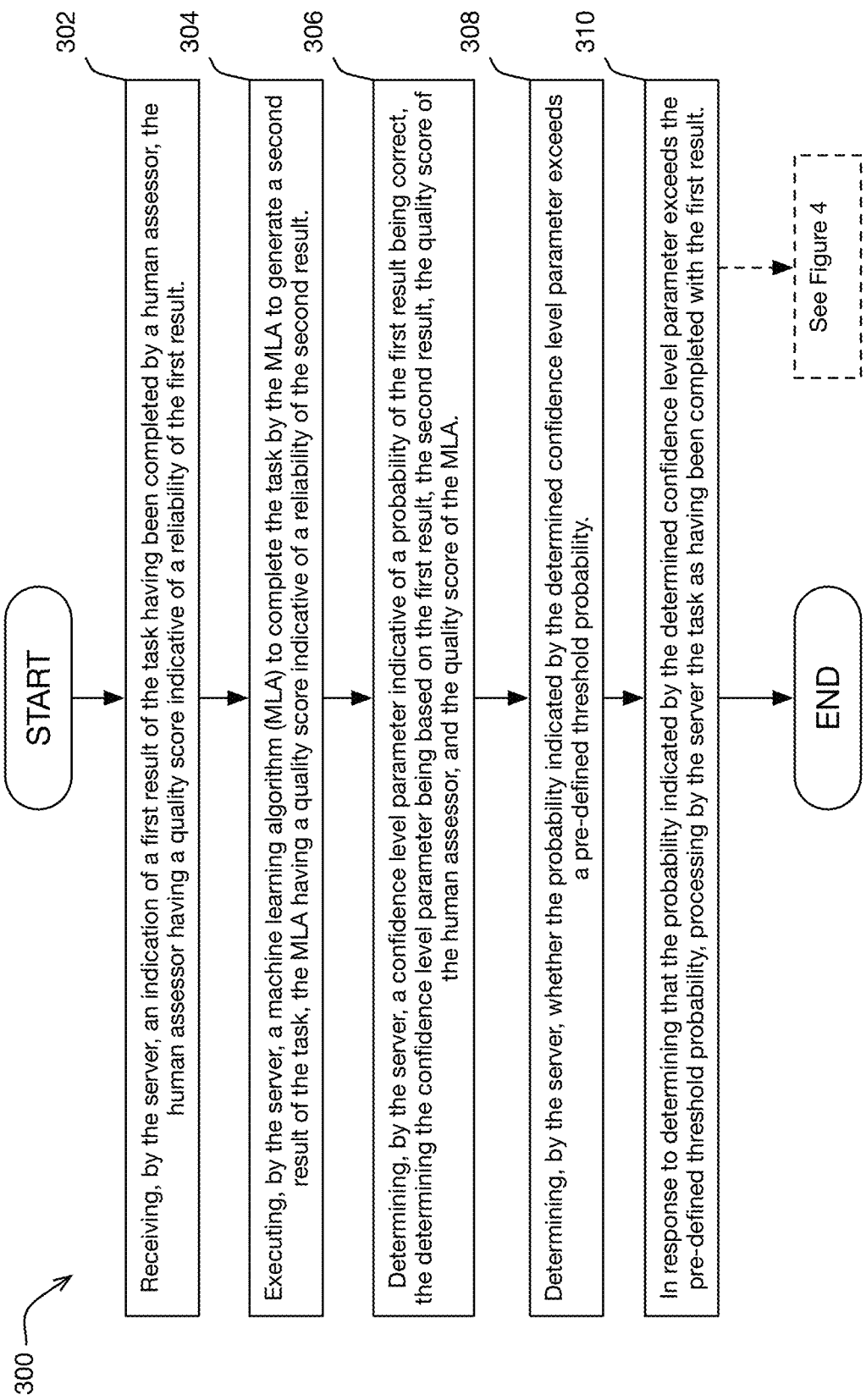
FIG. 3 depicts a schematic block diagram depicting a flow chart of the method executed by the system of FIG. 1, the method being implemented in accordance with the non-limiting embodiments of the present technology.

With the above configuration of the server 101, and now referring to FIG. 3, a method 300 of completing a task, the task being of a given type of task, could be executed. As noted above, a task of categorizing the image 103 of FIG. 2 is used for illustrating the present technology. To provide more context for the method 300, a non-limiting example application of the method 300 is described. In this non-limiting application, the method 300 is employed by a search engine provider, such as the Yandex™ search engine 116 available at www.yandex.ru, to filter out and exclude inappropriate adult content from search results provided by the search engine. Other applications are likewise contemplated.

In the present example, the method 300 is applied to each given image that is indexed by the Yandex™ search engine 116 for potential presentation to prospective users of the Yandex™ search engine 116, to determine whether each given image does or does not contain adult content. A technical result of the method 300 for each given image is that the method 300 returns a result indicative of whether the given image does or does not contain adult content with comparatively fewer assessment by the human assessors 104 being required.

Images that are determined to contain adult content, and images that cannot be categorized to a sufficient degree of probability, are indexed as such in the index of the Yandex™ search engine 116. This information can be used, for example, to filter out adult content when providing search results in a so-called "child safe" mode.

The method 300 is described in more detail next, for the sake of an example with respect to the image 103 in FIG. 2, which is taken as a given one of the yet-to-be-categorized images potentially available to users via the Yandex™ search engine 116.

Step 302—receiving, by the server, an indication of a first result of the task having been completed by a human assessor, the human assessor having a quality score indicative of a reliability of the first result.

Being applied to the image 103 of FIG. 2, the method 300 may start at step 302. Step which may include receiving, by the server 101, an indication of a first result of a task (in this example, the task of categorizing the image 103 as being either Category A or Category B) having been completed by a human assessor 104, the human assessor 104 having a quality score indicative of a reliability of the first result.

As a non-limiting example, let's say that the server 101 has received an indication, in the form of one or more data packets for example, of a first result from a first human assessor 104a of the pool of human assessors 104a, and the indication/first result is that the image 103 does not contain adult content (i.e. that the image 103 is of Category A "Safe content").

Continuing with this example, let's say the quality score/weight ($q_{w1}$) of the first human assessor 104a was determined to be 0.90. In some embodiments, the quality score/weight ($q_{w1}$) of the first human assessor 104a could be determined based on honeypot tasks as described above.

It should be noted that in some non-limiting embodiments, the first human assessor 104a is selected by the server 101 from the pool of human assessors 104 of the database 105, for executing the task of categorizing the image 103 of FIG. 2, at random. In some non-limiting embodiments, the first human assessor 104a is selected by the server 101 based the first human assessor 104a having indicated their availability before other human assessors 104 in the pool of human assessors 104 of the database 105.

In some non-limiting embodiments, the first human assessor 104a is selected by the server 101 based on the quality score/weight ($q_{w1}$) of the first human assessor 104a. In such embodiments, the method 300 comprises a step 301 that includes selecting, by the server 101, each given human assessor from at least one pool of human assessors, such as the pool of human assessors 104 of the database 105, based on the quality score 109 of the given human assessor 104 such that the quality score 109 of the given human assessor 104 is above a pre-determined quality score threshold (QST).

Also in non-limiting embodiments, the first human assessor 104a is selected by the server 101 further based on the pricing information associated with the available human assessors 104 and/or associated with the specific crowd-sourced task at hand. In some such embodiments, the server 101 executes a selection algorithm (not shown) with a plurality of settings that are made available to and can therefore be set and/or adjusted by a server administrator or by an entity requesting one or more tasks to be completed by the server 101. For example, in applications where the present technology is made available to requesters wishing to complete one or more particular types of tasks, the settings can be made available to the requesters such that the requesters can define a particular one or more balances between the reliability of the results that will be provided using the present technology, and the costs that will be associated with the results.

In some such embodiments, the server 101 could be configured to use only those human assessors 104 who: a) have quality scores 109 exceeding a first given threshold pre-determined by a given requester, and b) have indicated a price for their services that does not exceed a second given threshold, also pre-determined by the given requester.

In some such embodiments, and with regard to the above example, the server 101 could for example query the database 105 for the quality scores of at least some of the human assessors 104 in the pool of human assessors 104, and remove from consideration any human assessor 104 having a quality score that is equal to or below the pre-determined quality score threshold (QST). In some such embodiments, the server 101 could also query the database 105 for the prices associated with at least some of the human assessors 104 in the pool of human assessors 104, and remove from consideration any human assessor 104 having a price that exceeds a pre-determined price threshold (PPT). The server 101 may then use one or more criteria to select the first human assessor 104a from all the remaining human assessors 104 that have a quality score that exceeds the pre-determined quality score threshold (QST) and a price (PPT) that is below or equal to the pre-determined price threshold (PPT).

For example, the server 101 could select the one of the remaining human assessors 104 with the highest quality score to be the first human assessor 104a. In such embodiments, the server 101 could select the human assessor 104 having the next-highest quality score to be an additional human assessor 104 in cases where the additional human assessor 104 is required as described above. It is contemplated that other criteria could also be used in addition to or instead of the highest quality score.

In some such embodiments, the server 101 could be configured to use only those human assessors 104 who belong to one or more pre-defined trust groups 117 of the plurality of trust groups 117 established in the database 105. In some such embodiments, the server 101 could be configured to provide a graphical user interface (GUI) (not shown) that could be made available to a system administrator and/or the entity(ies) using the server 101. The GUI could allow to review and/or select one or more desired trust groups 117 out of the plurality of trust groups 117.

Step 304—executing, by the server, a machine learning algorithm (MLA) to complete the task by the MLA to generate a second result of the task, the MLA having a quality score indicative of a reliability of the second result.

Step 304 of the method 300, which could be executed before or after step 302, may include executing, by the server 101 the MLA 110 to complete the task of categorizing the image 103 to generate a second result of the task, the MLA 110 having a quality score indicative of a reliability of the second result. In at least some embodiments, the quality score of the MLA 110 is calculated as described above based on honeypot tasks.

Continuing with the non-limiting example, let's say that the server 101 has received an indication, in the form of one or more data packets for example, of a second result from the MLA 110, and the indication/second result is the same as the first result. Namely, that the image 103 does not contain adult content (i.e. that the image 103 is of Category A "Non-adult content").

Continuing with the example, let's assume the weight ($q_{w2}$) of the MLA 110 was determined to be 0.70 (70%).

Step 306—determining, by the server, a confidence level parameter indicative of a probability of the first result being correct, the determining the confidence level parameter being based on the first result, the second result, the quality score of the human assessor, and the quality score of the MLA.

After step 304, the method 300 may proceed to step 306. Step 306 may include determining, by the server 101, a confidence level parameter indicative of a probability of the first result (i.e. that the image 103 is of Category A "Non-adult content") being correct.

In some embodiments, the determining the confidence level parameter at this step may be based on the first result provided by the first human assessor 104a, the second result provided by the MLA 110, the quality score of the first human assessor 104a, and the quality score of the MLA 110. In some such embodiments, the confidence level parameter for the first result is determined as described above with regard to the confidence level parameter ($a_j$), by the server 101 determining the weighted majority result ($\hat{z}_j$) and executing the Bayesian function as described above.

In this particular example, because the first result and the second result match, the weighted majority result ($\hat{z}_j$) is that the image 103 is of Category A "Non-adult content", the result provided by the first human assessor 104a. Continuing with the present example, let's say that the confidence level parameter ($a_j$) is calculated to equal 0.955, or 95.5%, according to the Bayesian function described herein above.

If on the other hand the first result and the second result were different and thus did not match, then the Bayesian function in this first iteration would still have been executed by the server 101 with respect to the first result provided by the first human assessor 104a because the first human assessor 104a has a higher weight (0.90 versus the weight of 0.70 of the MLA 110). However, in such a case the Bayesian function described above would have outputted a confidence level parameter ($a_j$) indicative of a lower probability, for example of 0.79, or 79% instead of the 0.955, or 95.5%. This difference would reflect the fact of the first human assessor 104a and the MLA 110 "disagreeing" as to the correct categorization of the image 103.

Step 308—determining, by the server, whether the probability indicated by the determined confidence level parameter exceeds a pre-defined threshold probability.

Once the confidence level parameter for the first result provided by the first human assessor 104a is determined at step 306 above, the method 300 may proceed to step 308.

Step 308 may include the server 101 determining whether the probability indicated by the determined confidence level parameter ($a_j$) exceeds a pre-defined threshold probability, such as the pre-defined threshold probability (EPS). In some embodiments, this determination is executed by the server 101 as described herein above.

Step 310—in response to determining that the probability indicated by the determined confidence level parameter exceeds the pre-defined threshold probability, processing by the server the task as having been completed with the first result.

Step 310 of the method 300 includes, in response to determining that the probability indicated by the determined confidence level parameter ($a_j$) exceeds the pre-defined threshold probability (EPS), processing by the server 101 the task as having been completed with the first result.

Continuing with the non-limiting example in which the threshold probability (EPS) is pre-defined to be 0.92, or 92%, as described above, the server 101 would determine that the confidence level parameter ($a_j$) of 95.5% exceeds the threshold probability (EPS) of 92%. The server 101 would therefore process the task of categorizing the image 103 as having been completed with the weighted majority result ($\hat{z}_j$) which in the present example is the first result which indicates that the image 103 is of Category A "Non-adult content".

It is contemplated that in some cases, the MLA 110 could be deploy an algorithm, which would have associated quality scores approaching, being in the ballpark of, or exceeding the quality scores of typical "reliable" human assessors 104 having quality scores in the order of 90%. It is also contemplated that in some such cases, human assessors 104 could be used to "confirm" the results provided by such MLA 110. It is also contemplated that in some such cases, the method 300 may terminate by the server 101 processing a given task as having been completed with the result provided by the MLA(s) 110.

Notably, in an example situation such as the alternative situation described above with the first human assessor 104a stating that the image 103 is of Category A and the MLA 110 stating that the image 103 is of Category B, the server 101 would determine a confidence level parameter ($a_j$) being indicative of a lower probability of the Category A result being correct.

For example, with the above quality scores, the server 101 could determine that the confidence level parameter ($a_j$) is equal to 0.79, or 79%, which is below the threshold probability (EPS) of 92%. In such cases, the method 300 would not terminate at step 310 but would continue onto step 312, shown at FIG. 4 which is referred to next.

Step 312—receiving, by the server, an indication of at least one additional result of the task having been completed by at least one additional human assessor, the at least one additional human assessor having a quality score indicative of a reliability of the at least one additional result.

As shown in FIG. 4, in some embodiments, step 312 includes receiving, by the server 101, an indication of at least one additional result of the task (in this example, of categorizing the image 103) having been completed by at least one additional human assessor 104, the at least one additional human assessor 104 having a quality score 109 indicative of a reliability of the at least one additional result.

In the present example, the server 101 (or another entity) could submit the task of categorizing the image 103 to a second human assessor 104b of the pool of human assessors 104 that could be accessible via the database 105, and receive an indication of a third result (i.e. the at least one additional result) of the categorization having been completed by the second human assessor 104b after the second human assessor 104b completes the task.

For the sake of an example, let's say the second human assessor 104b returns the third result as indicating that the image 103 is of Category A. Also the sake of an example, let's say the second human assessor 104b has a quality score 109 of 0.80 (80%). The method 300 would then proceed to step 314.

Step 314—determining, by the server, a weighted majority result of the task based on: i) the first result, ii) the second result, iii) the at least one additional result, and iv) the quality score corresponding to each of the first result, the second result, and the at least one additional result, the weighted majority result being a given result having a largest cumulative quality score associated therewith, the given result being at least one of the first result, the second result and the at least one additional result.

Step 314 includes determining, by the server 101, a weighted majority result ($\hat{z}_j$) of the task as described above based on: i) the first result, ii) the second result, iii) the at least one additional result, which in this example is the third result provided by the second human assessor 104b, and iv) the quality score 109, 115 corresponding to each of the first result, the second result, and the at least one additional result. As described above, In accordance with the non-limiting embodiments of the present technology the weighted majority result ($\hat{z}_j$) is a given result having a largest cumulative quality score associated therewith, the given result being at least one of the first result, the second result and the at least one additional result.

The weighted majority result ($\hat{z}_j$) In accordance with the non-limiting embodiments of the present technology would be determined by the server 101 according to the $\hat{z}_j := \arg\max_{z \in Y} \sum_{i=1}^{n} q_{w_i} * I(y_j^{w_i} = z)$ function given above.

More particularly, in the present example, the first and third results are the same and therefore represent a first group of results. The first group of results therefore would have a cumulative weight of: 0.9*(1)+0.7*(0)+0.8*(1)=1.7, according to the abovementioned function.

The second result (of the MLA 110) is different from the first and third results, and therefore represents a second group of results that is different from the first group of results. The second group of results therefore would have a cumulative weight of 0.9*(0)+0.7*(1)+0.8*(0)=0.7, according to the abovementioned function.

In accordance with the non-limiting embodiments of the present technology, the server 101 would select one group of the at least two different groups, the one group having the largest cumulative quality score of the cumulative quality scores of the at least two different groups of results. In accordance with the non-limiting embodiments of the present technology, the server 101 would assign the result represented by the selected one group of results to be the weighted majority result ($\hat{z}_j$).

In the present example, since 1.7 cumulative weight of the first group of results is larger than 0.7 cumulative weight of the second group of results, the first group of results would be assigned to represent the weighted majority result ($\hat{z}_j$). The weighted majority result ($\hat{z}_j$) would thus be determined as the result corresponding to the first group of results. In this example, the weighted majority result ($\hat{z}_j$) would be that the image 103 is of Category A ("Safe content").

Once the weighted majority result ($\hat{z}_j$) is determined, the method 300 would proceed to step 316.

Step 316—determining, by the server, a second confidence level parameter indicative of a probability of the weighted majority result being correct.

Step 316 includes determining, by the server 101, a second confidence level parameter ($a_j$) indicative of a probability of the weighted majority result ($\hat{z}_j$) determined at step 314 being correct. In this embodiment of the method 300 and configuration of the server 101, step 316 is a repeat of the algorithm of step 306 above, performed with respect to the new set of results and their associated weights (quality scores). Step 316 is therefore not be described again in detail.

In the present example, let's say the determined second confidence level parameter ($a_j$) is determined using the Bayesian function described above to be indicative of a probability of 0.939, or 93.9%, of the weighted majority result ($\hat{z}_j$) determined at step 314 being correct. In the present example, the 93.9% would be a probability of the determination that the image 103 is of Category A being correct.

Step 318—in response to determining that the probability indicated by the second confidence level parameter exceeds the pre-defined threshold probability, processing by the server the task as having been completed with the weighted majority result.

At step 318, in response to determining that the probability indicated by the second confidence level parameter ($a_j$) exceeds the pre-defined threshold probability (EPS), the server 101 processes the task as having been completed with the weighted majority result ($\hat{z}_j$) determined at step 314.

In the present example, the probability of 93.9% indicated by the second confidence level parameter ($a_j$) exceeds the 92% pre-defined threshold probability (EPS). Accordingly, the server 101 processes the task of categorizing the image 103 as having been completed with the image 103 being determined to be of Category A.

According to the abovementioned non-limiting application of the method 300, since the result of the method 300 for image 103 was that the image 103 is of Category A ("Safe content"), the image 103 and web resource(s) associated with it would not be removed from the index of the Yandex™ search engine 116 and could be marked as "Safe content" for example, for presentation to users. The method 300 could then be executed with respect to a subsequent image, and a subsequent image, and so on. As a result, images and content indexed in the Yandex™ search engine 116 could at least in part be filtered by removing adult content therefrom.

One technical effect of applying the method 300 in this way could result in fewer human assessors 104 being used to execute one or more tasks, compared to a number of human assessors that could be required by at least some prior art methods to execute the same one or more tasks. A reduced number of human assessors could provide for a lower overall operating cost of a service such as the Yandex™ search engine 116 for example. A reduced number of human assessors could also provide for more efficient process, such as the example image categorization and removal of adult content described above. For example, in at least some cases, a process to filter N number of images using the present technology could take relatively less time to complete than a prior art process of filtering out the same N number of the same images.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects.

Modifications and improvements to the above-described implementations of the present technology may become apparent to those skilled in the art. The foregoing description is intended to be exemplary rather than limiting. For example, while particular methods were described herein above, it is contemplated that other methods could also be used in addition, in combination, or in alternative. As another example. while particular orders of methods steps have been set out herein above, it is contemplated that other orders of method steps could be used to carry out the methods described herein.

The invention claimed is:

1. A method of completing a task, the task being of a given type of task, the method being executed at a server, the method comprising:
    receiving, by the server, an indication of a first result of the task having been completed by a human assessor, the human assessor having a quality score indicative of a reliability of the first result;
    executing, by the server, a machine learning algorithm (MLA) to complete the task by the MLA to generate a second result of the task, the MLA having a quality score indicative of a reliability of the second result;
    determining, by the server, a confidence level parameter indicative of a probability of the first result being correct, the determining the confidence level parameter being based on the first result, the second result, the quality score of the human assessor, and the quality score of the MLA;
    determining, by the server, whether the probability indicated by the determined confidence level parameter exceeds a pre-defined threshold probability; and
    in response to determining that the probability indicated by the determined confidence level parameter exceeds the pre-defined threshold probability, processing by the server the task as having been completed with the first result.

2. The method of claim 1, further comprising determining a weighted majority result based on the first result and the second result, and wherein the determining the confidence level parameter is further based on the weighted majority result.

3. The method of claim 2, wherein the determining the weighted majority result includes determining whether the second result matches the first result.

4. The method of claim 1, wherein:
    the method further comprises determining, by the server, an error probability parameter associated with the human assessor, the error probability parameter associated with the human assessor being indicative of a probability of the first result being incorrect, and an error probability parameter associated with the MLA, the error probability parameter associated with the MLA being indicative of a probability of the second result being incorrect; and wherein
    the determining the confidence level parameter is further based on the error probability parameter associated with the human assessor and the error probability parameter associated with the MLA.

5. The method of claim 4, wherein the determining the confidence level parameter comprises executing, by the server, a Bayesian function with inputs into the Bayesian function including:
    the error probability parameter associated with the human assessor;
    the error probability parameter associated with the MLA;
    the quality score of the human assessor; and
    the quality score of the MLA.

6. The method of claim 5, wherein the determining the error probability parameter associated with the MLA is based on the quality score of the MLA and the determining the error probability parameter associated with the human assessor is based on the quality score of the human assessor.

7. The method of claim 6, further comprising, prior to the determining the confidence level parameter, determining by the server:
    the quality score of the human assessor based on a first plurality of honeypot tasks having been completed by the human assessor, each honeypot task of the first plurality of honeypot tasks having a pre-determined result accessible by the server; and
    the quality score of the MLA based on a second plurality of honeypot tasks having been completed by the human assessor, each honeypot task of the second plurality of honeypot tasks having a pre-determined result accessible by the server.

8. The method of claim 1, wherein the MLA:
    has been trained on a set of training tasks, each task of the set of training tasks being of the given type of task and having a pre-determined result;
    has executed a number of honeypot tasks, the honeypot tasks having pre-defined honeypot results;
    has provided, by having executed the number of honeypot tasks, a number of honeypot results; and wherein
    the quality score of the MLA is determined as a percentage of the number of honeypot results outputted by the MLA that match a corresponding one of the pre-defined honeypot results.

9. The method of claim 1, further comprising submitting, by the server, the task to the human assessor for execution thereof to generate the first result.

10. The method of claim 1, further comprising, prior to receiving the indication of the first result, selecting, by the server, the human assessor from a pool of human assessors based on the quality score of the human assessor such that the quality score of the human assessor is above a pre-determined quality score threshold.

11. The method of claim 1, wherein the task is one of: a categorization task, a web page evaluation task, a search result analysis task, a survey task, a relevance inquiry task, a product description analysis task, and a document analysis task.

12. The method of claim 1, wherein the task includes assessing a characteristic of a document.

13. The method of claim 12, wherein the task includes selecting the characteristic from a plurality of different possible characteristics associated with the document.

14. The method of claim 13, wherein the document includes at least one of: an image, a text, at least a part of a web page, a search result, a user interface, at least a part of a survey, a relevance inquiry, and a product description.

15. The method of claim 1, wherein the confidence level parameter is a first confidence level parameter, and wherein the method further comprises, in response to determining that the probability indicated by the first confidence level parameter is below the pre-defined threshold probability:
    receiving, by the server, an indication of at least one additional result of the task having been completed by at least one additional human assessor, the at least one additional human assessor having a quality score indicative of a reliability of the at least one additional result;
    determining, by the server, a weighted majority result of the task based on:
        i) the first result,
        ii) the second result,
        iii) the at least one additional result, and iv) the quality score corresponding to each of the first result, the second result, and the at least one additional result, the weighted majority result being a given result having a largest cumulative quality score associated therewith, the given result being at least one of the first result, the second result and the at least one additional result;

determining, by the server, a second confidence level parameter indicative of a probability of the weighted majority result being correct; and in response to determining that the probability indicated by the second confidence level parameter exceeds the pre-defined threshold probability, processing by the server the task as having been completed with the weighted majority result.

16. The method of claim 15, wherein the determining the weighted majority result comprises:

determining at least two different groups of results, each group of the at least two different groups of results comprising matching ones of the first result, the second result, and the at least one additional result;

determining, for each given group of the at least two different groups of results, a cumulative quality score based on the quality score of each result in the given group of results;

selecting one group of the at least two different groups having the largest cumulative quality score of the cumulative quality scores of the at least two different groups of results; and assigning the result represented by the selected one group of results to be the weighted majority result.

17. The method of claim 16, wherein the determining the second confidence level parameter is based on the quality score of each result in the selected one group of results.

18. The method of claim 17, wherein:

the determining the second confidence level parameter includes determining, by the server, an error probability parameter associated with each result that belongs to a group other than the selected one group of results, the error probability parameter being indicative of a probability of the result associated with the error probability parameter being incorrect; and wherein the determining the second confidence level parameter is further based on each determined error probability parameter.

19. The method of claim 18, wherein the determining the confidence level parameter comprises executing, by the server, a Bayesian function with each determined error probability parameter being an input to the Bayesian function.

20. The method of claim 15, wherein the MLA:

has been trained on a set of training tasks, each task of the set of training tasks being of the given type of task and having a pre-determined result;

has executed a number of honeypot tasks, the honeypot tasks having pre-defined honeypot results;

has provided, by having executed the number of honeypot tasks, a number of honeypot results; and wherein the quality score of the MLA is determined as a percentage of the number of honeypot results outputted by the MLA that match a corresponding one of the pre-defined honeypot results.

21. The method of claim 15, further comprising determining, by the server prior to the determining the second confidence level parameter, the quality score of each given human assessor of the human assessor and the at least one additional human assessor based on a plurality of honeypot tasks having been completed by the given human assessor, each honeypot task of the plurality of honeypot tasks having a pre-determined result accessible by the server.

22. A server for completing a task, the task being of a given type of task, the server comprising:

a processor; and a non-transient memory communicatively connected to the processor, the non-transient memory storing instructions that when executed by the processor, cause the server to:

receive an indication of a first result of the task having been completed by a human assessor, the human assessor having a quality score indicative of a reliability of the first result;

execute a machine learning algorithm (MLA) to complete the task by the MLA to generate a second result of the task, the MLA having a quality score indicative of a reliability of the second result;

determine a confidence level parameter indicative of a probability of the first result being correct, the determining the confidence level parameter being based on the first result, the second result, the quality score of the human assessor, and the quality score of the MLA;

determine whether the probability indicated by the determined confidence level parameter exceeds a pre-defined threshold probability; and in response to determining that the probability indicated by the determined confidence level parameter exceeds the pre-defined threshold probability, process the task as having been completed with the first result.

* * * * *